US008013290B2

(12) United States Patent
Räther et al.

(10) Patent No.: US 8,013,290 B2
(45) Date of Patent: Sep. 6, 2011

(54) METHOD AND APPARATUS FOR AVOIDING UNDESIRABLE MASS DISPERSION OF IONS IN FLIGHT

(75) Inventors: Oliver Räther, Bremen (DE); Karsten Michelmann, Harpstedt (DE); Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 519 days.

(21) Appl. No.: 11/779,452

(22) Filed: Jul. 18, 2007

(65) Prior Publication Data

US 2008/0156980 A1 Jul. 3, 2008

(30) Foreign Application Priority Data

Jul. 31, 2006 (DE) ........................ 10 2006 035 277

(51) Int. Cl.
*H01J 49/00* (2006.01)
*B01D 59/44* (2006.01)

(52) U.S. Cl. ........ 250/281; 250/282; 250/288; 250/287; 250/290

(58) Field of Classification Search .................. 250/281, 250/288, 287, 290, 282
See application file for complete search history.

(56) References Cited

U.S. PATENT DOCUMENTS 3,852,595 A * 12/1974 Aberth .......................... 250/288
3,949,221 A * 4/1976 Liebl ............................ 250/281
4,284,923 A * 8/1981 Pottier ......................... 315/5.51
4,959,543 A * 9/1990 McIver et al. ................. 250/291
5,101,105 A * 3/1992 Fenselau et al. .............. 250/281
5,360,976 A * 11/1994 Young et al. .................. 250/287
5,572,035 A 11/1996 Franzen
6,157,030 A * 12/2000 Sakairi et al. ................. 250/292
6,794,640 B2 * 9/2004 Bateman et al. .............. 250/281
6,794,641 B2 9/2004 Bateman
6,949,740 B1 * 9/2005 Sheehan et al. ............... 250/288
7,026,613 B2 * 4/2006 Syka ............................ 250/292

(Continued)

FOREIGN PATENT DOCUMENTS

EP 1648020 A2 4/2006

(Continued)

OTHER PUBLICATIONS

Brown, et al.; "A Novel MALDI Time of Flight Mass Spectrometer"; 53rd ASMS Conference on Mass Spectrometry and Allied Topics, 2005.

(Continued)

*Primary Examiner* — Robert Kim
*Assistant Examiner* — Brooke Purinton
(74) *Attorney, Agent, or Firm* — Law Offices of Paul E. Kudirka

(57) ABSTRACT

In a mass spectrometer a target volume is filled with ions of different mass but substantially the same energy from a distant storage device by forming a plurality of spatially-limited ion swarms consisting of ions having the same mass. The ion swarms are ordered either by a mass-sequential extraction from the storage device or by rearranging the order of flight as the ions are in flight, so that swarms of different mass ions simultaneously enter the target volume despite having different flight velocities. A mass-sequential extraction in the order of decreasing mass can be achieved in one embodiment by decreasing a pseudopotential barrier at the storage device which causes the heavy ions to emerge first. In another embodiment, the ions can be rearranged in flight by applying a bunching potential. A second reverse bunching potential then restores the energy of the ions to their original values.

7 Claims, 7 Drawing Sheets

U.S. PATENT DOCUMENTS

| | | | | |
|---|---|---|---|---|
| 7,276,688 | B2 | 10/2007 | Weiss | |
| 7,312,444 | B1 * | 12/2007 | Willougbhy et al. | 250/293 |
| 7,365,317 | B2 * | 4/2008 | Whitehouse et al. | 250/292 |
| 7,495,211 | B2 * | 2/2009 | Franzen et al. | 250/291 |
| 2002/0011560 | A1 * | 1/2002 | Sheehan et al. | 250/283 |
| 2003/0132377 | A1 * | 7/2003 | Bateman et al. | 250/281 |
| 2003/0222214 | A1 * | 12/2003 | Baba et al. | 250/292 |
| 2004/0108456 | A1 * | 6/2004 | Sudakov et al. | 250/288 |
| 2004/0245453 | A1 * | 12/2004 | Izgarian et al. | 250/288 |
| 2005/0133711 | A1 | 6/2005 | Kawato | |
| 2005/0247872 | A1 * | 11/2005 | Loboda et al. | 250/288 |
| 2005/0258364 | A1 * | 11/2005 | Whitehouse et al. | 250/292 |
| 2006/0027743 | A1 * | 2/2006 | Franzen et al. | 250/286 |
| 2006/0076485 | A1 | 4/2006 | Stoermer et al. | |
| 2006/0226357 | A1 * | 10/2006 | Franzen et al. | 250/307 |
| 2008/0156980 | A1 * | 7/2008 | Rather et al. | 250/287 |

FOREIGN PATENT DOCUMENTS

| | | |
|---|---|---|
| GB | 2401243 A | 11/2004 |

OTHER PUBLICATIONS

Pringle, et al.; "An Investigation into a Method of Improving The Duty Cycle on OA-TOF Mass Analyzers"; Proc. of the 52nd ASMS Conference on Mass Spectrometry and Allied Topics, Nashville, May 23-27, 2004.

Giles, et al.; "Applications of a Traveling Wave-Based Radio-Frequency-Only Stacked Ring Ion Guide"; Rapid Commun. Mass Spectrom.

* cited by examiner

METHOD AND APPARATUS FOR AVOIDING UNDESIRABLE MASS DISPERSION OF IONS IN FLIGHT

BACKGROUND

The invention relates to the loading process of a target volume with ions of different mass but same energy from a somewhat distant ion storage device inside a mass spectrometer. The loading process normally exhibits an often undesirable mass dispersion. The target volume can be, for example, the measuring cell of an ion cyclotron resonance mass spectrometer (ICR-MS), the pulser of a time-of-flight mass spectrometer with orthogonal ion injection (OTOF) or an electrostatic ion trap.

Ion cyclotron resonance mass spectrometers have a measuring cell 65 which is located far away from the ion source 61 in the interior of a strong magnetic field produced by a magnet field generator 66, as shown in FIG. 1. The ions of the ion source are generally collected in an intermediate storage device outside the magnetic field and then transferred into the measuring cell at the beginning of a measuring cycle. The transfer takes place collision-free in an ion beam. The ions are, in principle, free-flying but can also be guided along the path by an ion guide. It is a well-known fact that it is difficult to capture the ions in the measuring cell; it would be very favorable if the ions of all masses could enter in a small ion bunch synchronously the measuring cell with the same low energy of only fractions of an electron-volt. Specialists in the filed are familiar with the details of this problem. The ions are prevented from entering at the same time, however, by the different flight velocities of the ions of different masses between the storage device and measuring cell, resulting in a mass dispersion. This mass dispersion can be reduced by strongly accelerating the ions from the storage device and strongly decelerating them before they enter the measuring cell, but it cannot be eliminated completely.

The ions must also be focused into a narrow ion beam so that they can be threaded into the strong magnetic field, a process which is carried out in axial direction through the fringe field of the magnet. Ions somewhat outside the axis of the fringe field are first wound up into increasingly narrow spirals by the fringe field, as in a magnetic bottle, and then reflected.

Similar problems with mass dispersion also occur when electrostatic ion traps have to be filled, such as Kingdon-type ion traps. The ions are held in orbits by radial electric fields in these electrostatic ion traps. The ions are injected with the same energy into an orbit through an electrically switchable input region. The filling must be completed before the fastest, i.e. the lightest ions pass the injection point again after having completed one orbit because the potentials then must have be changed from injection mode back to orbit conditions. As far as possible, the ions of all masses must enter the electrostatic ion trap at the same time; on no account must heavy ions enter later than light ions. Also here, a narrow ion beam is favorable for ion injection.

Mass dispersion also disturbs time-of-flight mass spectrometers with orthogonal ion injection when the ions are being injected from a storage device into the ion pulser which pulse ejects the ions into the flight path. The mass dispersion leads here to a mass discrimination of the spectrometer.

In all these cases, there is usually a collision gas in the storage device which serves to collision focus and cool the ions. The ions can then readily collect in the axis of the storage device and have a very narrow energy spread. The above-described target volumes, on the other hand, all must be positioned in regions with a very good vacuum in order to prevent the ions undergoing any collisions with molecules of residual gas. The ions therefore usually have to pass, between storage device and target volume, through one or more differential pump stages. The ions are transferred from the storage device to the target volume by collision-free flight, at least with as few collisions as possible, after they have been accelerated out of the storage device.

Different technical areas of mass spectrometry thus suffer a similar problem which occurs when ions are transferred from a storage device into a distant target volume and primarily consists in the mass dispersion of ions with different mass but equal energy. The ions of different mass have different velocities and therefore arrive at the target volume in a velocity-dependent order which, depending on the purpose of the target volume, can lead to problems. A wide distance between the storage device and the target volume to be filled is often unavoidable; it is usually enforced by the requirement to have differential pumping between the storage device and the target volume to be filled, but it can also be necessary because of other situations, for example the long starting path into a strong magnetic field. A secondary problem lies in the fact that a narrow ion beam must be formed.

These situations will be explained here in a little more detail using the example of a time-of-flight mass spectrometer, although the problem-solving idea of the invention described below shall not be solely limited to the situation in this time-of-flight mass spectrometer.

The term "mass" here always refers to the "charge-related mass" m/z, also called "mass-to-charge ratio", and not simply to the "physical mass" m. The dimensionless number z is the number of elementary charges of the ion, i.e. the number of excess electrons or protons which the ion possesses and which act externally as the ion charge. All mass spectrometers without exception measure only the charge-related mass m/z and not the physical mass m itself. The charge-related mass is the mass fraction per elementary ion charge. The terms "light" and "heavy" ions here are always analogously understood as being ions with low or high charge-to-mass ratio m/z respectively. The term "mass spectrum" also always relates to the mass-to-charge ratios m/z.

Time-of-flight mass spectrometers where a primary ion beam is injected orthogonally to the flight path are termed OTOF (orthogonal time-of-flight mass spectrometers). FIG. 2 illustrates an OTOF of this type. They have a so-called pulser (11) at the beginning of the flight path (19) which accelerates a section of the primary ion beam (10), i.e. a string-shaped ion package, into the flight path (19) at right angles to the previous direction of the beam. This causes a band-shaped secondary ion beam (12) to form, which is comprised of individual string-shaped ion packages lying transversely, consisting of ions with the same mass. The string-shaped ion packages with light ions fly quickly; those with heavier ions fly more slowly. The direction of flight of this band-shaped secondary ion beam (12) is between the previous direction of the primary ion beam and the direction of acceleration at right angles to this because the ions retain their velocity in the original direction of the primary ion beam (10). A time-of-flight mass spectrometer of this type is preferably operated with a velocity-focusing reflector (13) which reflects the whole width of the band-shaped secondary ion beam (12) with the string-shaped ion packages and directs it toward a detector (14) which is likewise flat.

As can be seen in FIG. 2 and in the detailed representation of the injection regime in FIG. 3, the ions of the primary ion beam (10) are accelerated in the pulser (11) at right angles to the direction in which they are injected, the x-direction. The direction of acceleration is called the y-direction. The direction of the resulting ion beam (12) is between the y-direction and the x-direction, since the ions retain their original velocity in the x-direction. The angle between the ion beam (12) and the y-direction is $\alpha=\arctan(v_x/v_y)$, where $v_x$ is the velocity of the ions in the primary beam in the x-direction and $v_y$ is the velocity component of the ions after they have been accelerated in the y-direction. The angle $\alpha$ is exactly the same for ions of different masses when they all fly with the same kinetic Energy $E_x$ into the pulser because they all receive the same additional kinetic Energy component $E_y$, and $v_x/v_y$ is proportional to $\sqrt{(E_x/E_y)}$. Thus the flight direction of the ions in the ion beam (12) after they have been ejected as a pulse does not depend on the mass of the ions if all ions of the original ion beam (10) had the same kinetic energy $E_x$, i.e. all were accelerated with the same voltage difference in the x-direction.

The pulser (11) operates at pulsing rates between 5 to 20 kilohertz depending on the desired mass range of the spectrometer. If one considers a time-of-flight mass spectrometer which operates at 10 kilohertz, then 10,000 individual mass spectra are acquired per second which, in modern time-of-flight mass spectrometers, are digitized in a transient recorder and added together to form sum spectra. A mass spectrum here can quite easily contain mass signals with around 1,000 ions before one needs to worry about saturation of the electronic components in the detector. (Older time-of-flight mass spectrometers operate with event counters or time-to-digital converters but have only a narrow dynamic range of measurement since the dead times mean that they can identify only a single ion in each mass peak). It is possible to set the length of time over which the transient recorder adds the spectra: the summing time can be a twentieth of a second, in which case around 500 individual mass spectra can be added to form a sum spectrum. But the addition can also be carried out over a hundred seconds and encompass a million individual mass spectra in the sum spectrum. This latter sum spectrum then has a very high dynamic measuring range of about eight orders of magnitude for the measurement of the ions in the spectrum.

The ions whose mass spectrum is to be measured are not generally a homogeneous ionic species but rather a mixture of light, medium and heavy ions. The mass range here can be very broad. In protein digest mixtures, for example, the mass range of interest extends from the lightest immonium ion up to peptides with around 40 amino acids, i.e. from a mass of 50 Daltons to around 5,000 Daltons. In time-of-flight mass spectrometers for the elemental analysis of metals or organic materials with ionization by inductively coupled plasma (ICP), the mass range of interest is between 5 Daltons (analysis of lithium) up to roughly 250 Daltons (analysis of uranium and transuranic elements). To obtain quantitatively good analytical results there should be no mass discrimination over these wide mass ranges.

In the time-of-flight mass spectrometer in FIGS. 2 and 3, the primary ion beam is extracted from an RF ion guide (8), which serves here as the storage device, with the aid of a lens system (9) and injected with a low energy of only around 20 electron-volts into the emptied pulser (11). The primary ion beam (10) here must be positioned extremely accurately and also reproducibly in the pulser. However, a primary ion beam (10) with an energy of 20 electron-volts is extraordinarily sensitive to external electric or magnetic influences; it therefore has to be shielded with a casing (18) which has very good electrical conductivity. There are two modes of operation here: continuous and pulsed. In continuous mode, the primary ion beam (10) is not interrupted; it flows continuously toward the pulser (11). After the pulsed ejection, the pulser (11) is again returned to voltages which enable it to be refilled, and so the pulser (11) again fills with ions. However, in the vicinity of the pulser (11), the process of pulsed ejection greatly interferes with the primary beam (10) far into the shielding casing (18); it therefore takes a while until the undisturbed primary beam (10) is accurately and correctly positioned so as to be able to fill the pulser (11) again. For this reason a pulsed mode is normally chosen, in which the primary beam (10) to the pulser (11) is interrupted by means of a switchable lens (9) and the beam is only enabled for filling again when the potentials have stabilized after the electrical switching process. This makes it possible to slightly increase the duty cycle for the measurement of the ions.

Between the storage device and pulser, differential pumping must occur and the ion beam must also be well-shielded by the casing (18); there has to be a spatial separation between the storage device and pulser. The process of injecting the ions into the pulser therefore discriminates according to mass. If this injection process for the pulser (11) is interrupted after a short time by pulsed ejection of the ions into the flight path (20), very light ions of the primary ion beam (10) have already reached the end of the pulser (11), medium mass ions have only penetrated a short way into the pulser (11), while heavy, and hence slow, ions have not even reached the pulser (11). The pulse-ejected ion beam (12) thus contains only light and a few medium-mass ions. There are no heavy ions at all. For a very long injection time, on the other hand, during which the heavy ions have penetrated to the end of the pulser (11), these heavy ions are predominant in the pulse-ejected ion beam (12) since the high velocity of the medium-mass and light ions means that most of them have already left the pulser (11) again.

The diagram in FIG. 4 illustrates this behavior. A quadrupole rod system (8) some 8 centimeters in length with a switchable lens (9) at the end is used as the ion storage device. In this graph, the time delay t (in microseconds) between the pulsed ejection of the ions from the pulser (11) and the opening time of the switchable lens (9) is plotted on the horizontal axis, and the logarithm of the ion current for ions of different masses forms the vertical axis. The dynamic range of measurement is not selected so as to be very high here; it is somewhat higher than four powers of ten. It can be seen that the ions with a mass of 322 Daltons fill the pulser optimally after only 30 microseconds, whereas the ions with a mass of 2722 Daltons need around 160 microseconds to reach their maximum intensity in the pulser. If heavy ions are to be detected, this can only be done using a measuring mode with a delay time for the pulsed ejection of around 160 microseconds. The light ions are then already at around 10% of their maximum intensity, however, simply because the storage device (8) is continuously filled with more ions through the lens (7), said ions simply passing through the storage device (8). This limits the rate of spectrum acquisition to a maximum of 6 kilohertz. The mass spectrum in FIG. 5 was acquired with this conventional method and a delay time of 160 microseconds: The mass spectrum shows a mixture of substances which are usually used to calibrate mass spectrometers.

Time-of-flight mass spectrometers with orthogonal ion injection can only ever operate within limited mass ranges since, on the one hand, the ion guide (6) and storage device (8) always create lower (and upper) mass limits and, on the other, the acquisition rate imposes a maximum duration for the spectrum acquisition and hence for the upper limit of the mass range measured. In general, it is possible to set several operating mass ranges in this type of time-of-flight mass spectrometer, for example 50 to 1,000 daltons, 200 to 3,000 daltons or 500 to 10,000 daltons. The conditions for the ion guides and storage devices and the acquisition rate are then adapted to the operating mass ranges.

When the time-of-flight mass spectrometer is operated according to the prior art, as is shown in FIGS. 2, 3 and 4, there is thus an optimum delay between the opening time of lens (9) and the pulsed ejection of the pulser (11) for the detection sensitivity of ions of a specific mass within the operating mass range which has been set for the time-of-flight mass spectrometer. This has already been elucidated in principle in U.S. Pat. No. 6,285,027 B1 (I. Chernushevich and B. Thompson). A preferred internal mass range with maximum sensitivity can be set via the opening time of the lens (9), the duration of injection into the pulser (11) and the ejection time, although this inevitably discriminates against ions of other masses in the operating mass range set. The delay time can be controlled via the electrical configuration of the switchable lens (9) and the pulser (11). This mode of operation where a mass has always to be selected, for which an optimum sensitivity is achieved, is very impractical for an analytical method, however, and difficult to perform in practice.

The energy of the injected ions in the primary ion beam (10) basically represents a further parameter. However, this energy of the injected ions is usually not adjustable, or adjustable only within very narrow limits which are determined by the geometry of the time-of-flight mass spectrometer, and in particular by the distance between pulser (11) and detector (14), depending on the overall flight distance in the time-of-flight mass analyzer. This distance determines the angle of deviation $\alpha$ explained above which must be maintained in order to operate the mass spectrometer, otherwise the ions do not impinge directly onto the detector.

The energy spread of the ions must be very narrow to fill the pulser in the time-of-flight mass spectrometer, otherwise the ions enter the flight path at different angles of deviation $\alpha$ and not all of them impinge onto the detector. For other target volumes as well, for example for filling the measuring cell in the ICR mass spectrometer, it is important that the energy spread of the ions is very narrow.

The use of traveling field effects in so-called "traveling wave guides" makes it possible to inject ions of different masses simultaneously into the pulser (11) because this imparts the same velocity to all ions, see also "An Investigation into a Method of Improving The Duty Cycle on OA-TOF Mass Analyzers", S. D. Pringle et al., Proc. of the 52nd ASMS Conference on Mass Spectrometry and Allied Topics, Nashville, May 23-27, 2004, or "Applications of a traveling wave-based radio-frequency-only stacked ring ion guide", K. Giles et al., Rapid Commun. Mass Spectrom. Since the ions of different masses have different kinetic energies, they are all pulse-ejected from the pulser (11) at different angles of ejection a for the ion beam (12), which means that not all of them arrive at the detector (14). The mass discrimination now occurs at the detector (14) and no longer in the pulser (11).

A further option for compressing the ions clouds of different masses is described in the paper "A Novel MALDI Time of Flight Mass Spectrometer" by J. F. Brown et al., 53rd ASMS Conference on Mass Spectrometry and Allied Topics, 2005, although in this case the ions in the pulser do not have the same energy so that the mass discrimination is again shifted to the detector.

The injection method for the pulser (11) at a given energy of the ions in the primary ion beam (10) must be optimized not only with respect to starting time and duration. It is also necessary to generate a narrow primary ion beam (10) of optimal cross section so that the time-of-flight mass spectrometer has a high resolution. If all ions fly one behind the other precisely in the axis of the pulser (11), and if the ions have no velocity components transverse to the primary ion beam (10), then theoretically, as can be easily understood, it is possible to achieve an infinitely high mass resolution because all ions of the same mass fly as almost infinitely thin ion strings exactly in the same front and impact onto the detector (14) at precisely the same time. If the primary ion beam (10) has a finite cross section, but no ion has a velocity component transverse to the direction of the primary ion beam (10), it is again theoretically possible to achieve an infinitely high mass resolution by space-focusing in the pulser (11) in the familiar way. The high mass resolution can even be achieved if there is a strictly proportional correlation between the location of the ion (measured from the axis of the primary beam in the direction of the acceleration, i.e. in the y-direction) and the transverse velocity of the ions in the primary beam (10) in the direction of the acceleration. If no such correlation exists, however, that is if the locations of the ions and the transverse velocities of the ions are statistically distributed with no correlation between the two distributions, then it is not possible to achieve a high mass resolution.

In addition to optimizing the injection process with respect to the mass range of the ions supplied, it is thus also necessary to condition the ions in the primary ion beam (10) with respect to their spatial and velocity distribution in order to achieve a high mass resolution in the time-of-flight mass spectrometer. To condition the ion beam in this way, ions which have been well thermalized by undergoing collisions in the neutral collision gas must be extracted in a very narrow beam from the axis of the storage device (8) by a very good ion-optical lens system (9).

Storage devices generally take the form of multipole RF rod systems filled with collision gas and terminated at both ends with diaphragms or lens systems with an ion-repelling potential. The rod systems are usually either quadrupole or hexapole systems. The ions lose their kinetic energy in collisions with the collision gas and collect in the minimum of the pseudopotential, i.e. in the axis of the rod system. This process is called "collision focusing". The pseudopotential minimum for light ions is more pronounced and steeper than for heavy ions, so the light ions collect precisely in the axis and the heavier ions more to the outside, kept apart by the Coulomb repulsion of the light ions. This effect is only observed when filling with large numbers of ions, however. In normal operation, a time-of-flight mass spectrometer is filled with a few thousand ions or so; usually only a few hundred ions. At these levels, the mass-selective arrangement of the ions in the storage device is not yet measurably effective.

In rod systems with more than three rod pairs (octopole, decapole or dodecapole rod systems) the minimum of the pseudopotential in the axis is not so pronounced, and the ions, repelled by their own space charge, can also collect outside in front of the rods. It is then more difficult to draw out the ions as a fine beam close to the axis.

If the storage devices take the form of rod systems whose pole rods are arranged in parallel, then they are also termed "linear ion traps", in contrast to so-called "three-dimensional ion traps", which comprise ring and end cap electrodes. Rod systems with two or three pairs of rods which generate quadrupole or hexapole fields in the interior make particularly good storage devices. It should be noted, however, that three-dimensional ion traps can also be used as storage devices. There are also completely different systems which can likewise be used as storage devices, for example quadrupole or hexapole stacks of plates as described in the patent application publication DE 10 2004 048 496 A (C. Stoermer et al., equivalent to GB 2 422 051 A and US-2006-0076485-A1).

These plate stacks can create a potential gradient in the interior along the axis, making it possible to expel ions quickly from the storage device. Something similar also applies to ion storage devices made of coiled pairs of wires, as in patent DE 195 23 859 C2 (J. Franzen, equivalent to U.S. Pat. No. 5,572,035 A and GB 2 302 985 B).

The pressure in the storage device amounts generally to values between 0.01 and 1 Pascal. The vacuum pressure in the pulser and in the flight path (19) of the time-of-flight mass spectrometer must be maintained very low, however, preferably at a value below $10^{-4}$ Pascal. This requires that the lens system (9) also acts as a barrier for the collision gas and that there must be differential pumping between the storage device and pulser. The lens system therefore either has to incorporate a diaphragm with a very fine aperture, for example only around 0.5 millimeters, or must itself undergo an intermediate evacuation, i.e. it must be constructed as a differential pressure stage.

If it were possible to transport all the thousand ions of one filling of the storage device to the detector with no losses and measure them, then an operating rate of 10 kilohertz would enable ten million ions to be measured per second without mass discrimination. The dynamic range of measurement for spectral scans of one second's duration would be around 1:1,000,000. These values cannot be achieved with the mode of operation usually used hitherto.

SUMMARY

The basic idea of the invention consists in dispatching the ions from the storage device to the distant target volume as sorted "ion swarms". As used herein, an ion swarm is a spatially limited cloud of ions with the same mass. The ion swarms are dispatched with time-controlled mass-specific delay times so that the ion swarms arrive at the target volume at essentially the same time with essentially the same kinetic energy of the ions and with a narrow energy spread. The ion swarms with heavy and therefore slower ions must be dispatched earlier than the ion swarms with light and fast ions in order that all arrive at the same time. The sorting of the ion swarms for the mass-specific time delay can either be performed during the extraction of the ions from the storage device or by rearranging the ion swarms during their flight to the target volume. Several sorting options for both methods are presented.

The ion swarms can be extracted from the storage device mass-sequentially from heavy to light ions with the aid of a mass-selectively surmountable potential barrier at the exit of the storage device.

This potential barrier can be a DC barrier in a lens system, for example, in conjunction with a harmonic potential well inside the storage device, in which the ions can be resonantly excited so that they can surmount the potential barrier. One example is the axial ejection from a linear ion trap by radial resonant excitation of the mass-specific ion oscillations in the fringe field at the end of the ion trap. The ions leave the linear ion trap with only a very narrow energy spread. It is easy to design an ejection method for this whereby the ejection is done mass-sequentially from high to low masses and is temporally controlled in such a way that the same acceleration energy is imparted to the ion swarms and that they arrive in the target volume at the same time.

An even simpler method is to close the storage device with a grid which creates a pseudopotential barrier because the grid rods are connected alternately to the phases of an RF voltage. The pseudopotential barrier forms saddle-shaped mountain passes between the grid rods, as can be seen in FIG. 11. For a given RF voltage the height of the saddles of this pseudopotential barrier is inversely proportional to the mass of the ions. If the pseudopotential barrier is reduced by lowering the RF voltage, first ions with high mass and then increasingly ions with lower masses emerge across the mountain passes. Fast emptying forms short ion swarms. The emerging ions are accelerated slightly as they roll down the mountain pass, the acceleration being the same for ions of all masses. The ions can then be uniformly post accelerated and fired to the target volume. If the correct time function is selected for reducing the RF voltage, the ion swarms of all masses can reach the target volume at the same time. Special measures are necessary here to generate a fine ion beam; they are described below. The ions can be pushed against the terminating grid by a DC potential gradient in the storage device, allowing the ions of the same mass to emerge quickly and forming quite short ion swarms.

It would seem to be a good idea to use linear or three-dimensional RF ion traps as the storage device and to eject the ions by means of one of the scanning functions which are known for these ion traps through slits in the rod electrodes or through holes in the end cap electrodes of these ion traps. These embodiments, however, do not fulfill the objective of the invention because they do not eject the ions with homogeneous energies. As they pass through the slits or holes, the ions are accelerated according to the phase and strength of the RF voltage, the acceleration ranging from low kinetic energies of the ions to several kiloelectron-volts. This absolutely enormous energy spread of the ions means this type of ion trap cannot be used as a storage device for this invention.

As has already been noted, the order of flight of the ion swarms extracted in the usual way can also be reversed. If all ions escape from the storage device at the same time without any special measures, and if these ions are all uniformly accelerated, the ion swarms separate in flight, with the light ions leading. If the ions are present in the form of relatively short ion swarms, rapid control of potentials makes it possible in certain flight regions to accelerate the heavy ions in proportion to their mass so that the heavier ions can overtake the lighter ions in a further flight region. This type of mass-selective acceleration is termed "bunching". The heavier ions now fly ahead but they have a higher kinetic energy. If the heavier ions are now decelerated again mass-sequentially by a potential increase which can be switched off, this also achieves the effect which is necessary for the invention, i.e. that the heavier ions fly ahead of the light ions with the same energy but slower velocity towards the target volume.

It is particularly favorable if the extraction or sorting generates ion swarms which are so short that the target volume can completely accommodate the ion swarms. This makes it particularly easy to capture the ions in the measuring cells of ion cyclotron resonance mass spectrometers and is absolutely necessary for filling electrostatic ion traps and likewise favorable for the pulsers in time-of-flight mass spectrometers since, in this case, a desired high ion utilization rate is achieved. Short ion swarms are generated by rapid emptying; short storage devices and DC potential gradients inside the storage device are useful here. The term "ion swarm" was defined above as a spatially limited swarm of ions with the same mass which forms one part of the ion beam.

Figure 18:
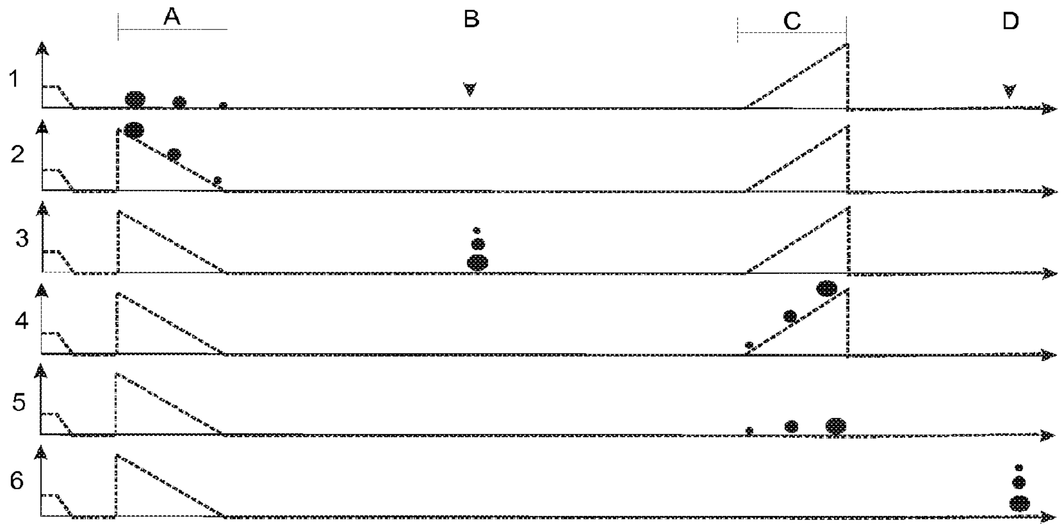

The six tracks 1-6 in FIG. 18 illustrate how the order of flight of short ion swarms is reversed by bunching into the order according to the invention and how a second reversed bunching can bring the ions back to the same energy again. When the ion swarms have reached the section A, the heavy ions can be accelerated compared to lighter ions by switching on a bunching potential gradient (track 2) so that they (track 3) overtake the light ions at point B. The heavy ions now continue to fly with increased velocity but are decelerated again by a bunching potential gradient in section C (track 4). If all ions now have the same kinetic energy again because of the deceleration, the decelerating potential is switched off (track 5) and the ion swarms now again fly on with equal energy. The light ions catch up with the heavy ones again at point D (track 6); the target volume must be placed at this point D.

Figure 19:
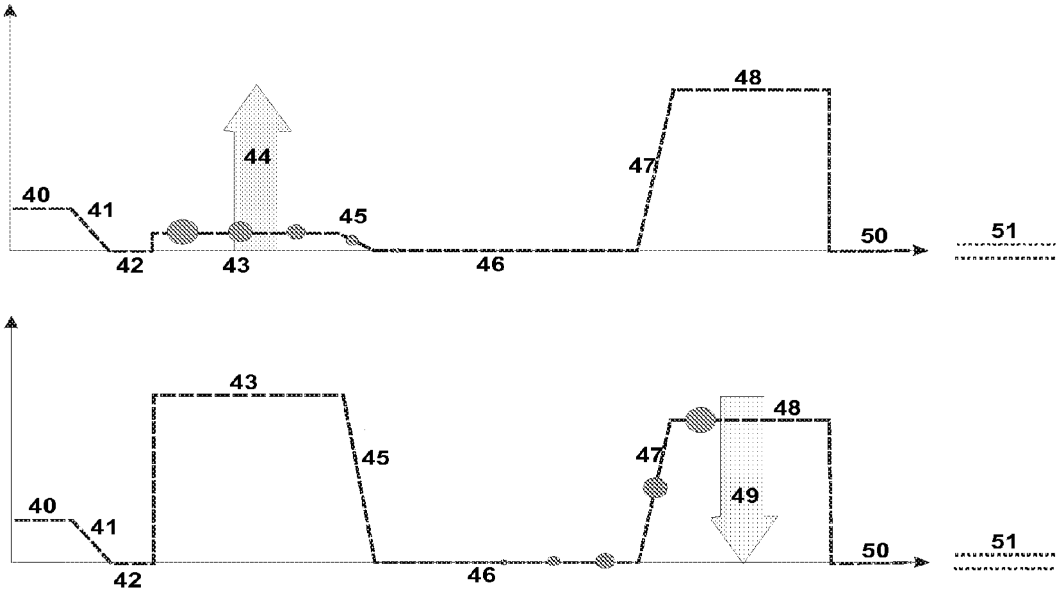

FIG. 19 illustrates that this process can also be brought about by dynamic changes to the potentials ("dynamic bunching") in individual sections. It shows a schematic arrangement to reverse the order of the ion packages of different masses in a flight region with increasing and decreasing potentials in two sections of the flight region. Region (40) represents the potential in the storage device and (41) the potential gradient of the acceleration region in the lens unit (9). Region (42) is a field-free flight region in which the ion swarms of light ions (small circles) move farther away than those of the heavy ions (large circles). The ion swarms then pass into the potential section (43) which is initially at base potential but continuously increases after all the ions have entered, see arrow (44). If the process is controlled correctly, the light ions are not accelerated further as the ions leave but the heavier ones are. In the field-free flight region (46) the order of flight is then reversed since the heavy ions overtake the light ones. The additional energy of the heavy ions is decelerated again by the potential (47) in section (48); the potential of section (48) is steadily reduced to the basic potential (see arrow (49)) in such a way that the light ions are no longer decelerated at all. The ions then pass to the target volume (51) (outlined schematically here) in the order according to the invention and with their energy having been restored to equal values.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 4:
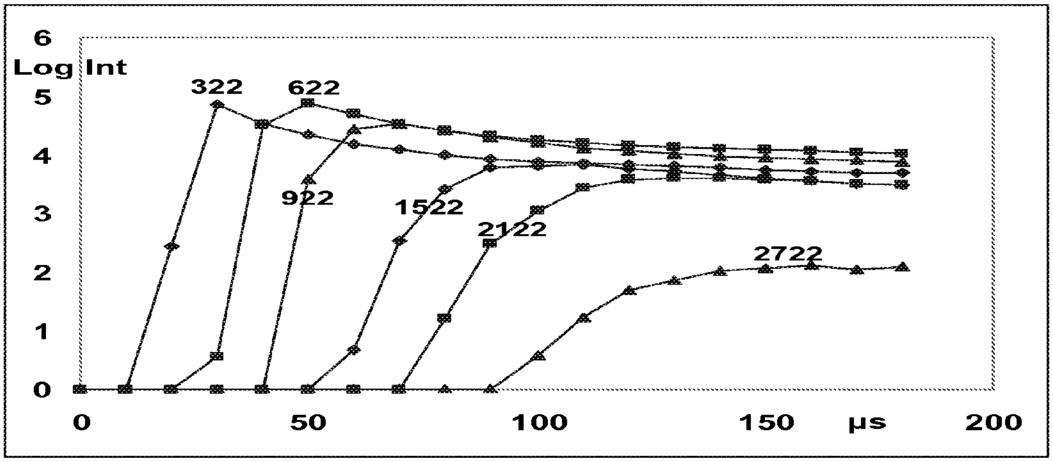
FIG. 4 represents a diagram with measured ion quantities obtained with the arrangement shown in FIGS. 2 and 3 for different delay times of pulser ejection. The logarithms of the measured quantities of the ionic species with 322, 622, 922, 1522, 2122 and 2711 Daltons are plotted against the delay time (in microseconds) of the pulsed ejection in the pulser (11) with respect to the time the switchable lens (9) opens. With a delay time of around 160 microseconds, the ions of all the masses can be measured simultaneously, but the light ions have already dropped to around 10 percent of their maximum quantity. This mode of operation corresponds to that of conventional commercial mass spectrometers of this type.
Figure 5:
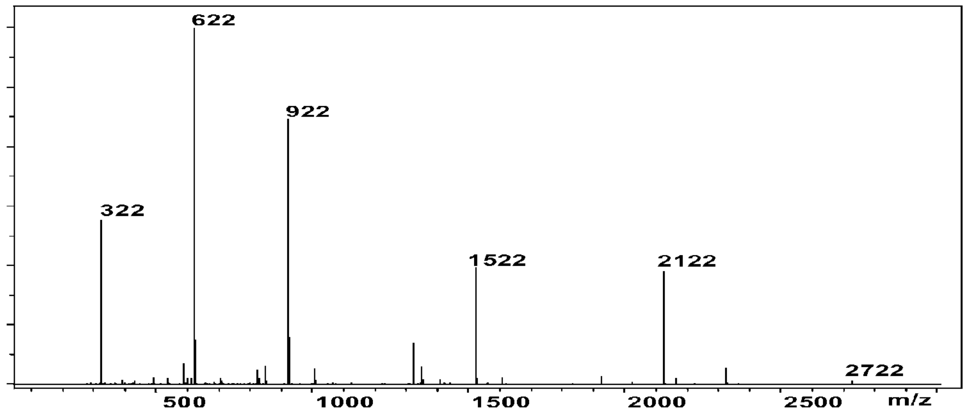
FIG. 5 illustrates a mass spectrum obtained with the arrangement shown in FIG. 3 and a delay time of 160 microseconds.
Figure 6:
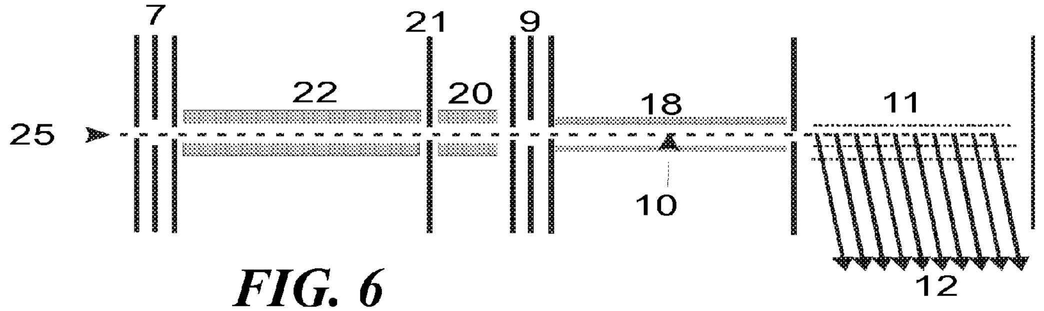
FIG. 6 shows an experimental modification of the set-up in FIG. 3 which does not correspond to the prior art: the storage device (8) in FIG. 3 has been divided into two ion storage devices (20) and (22) with a barrier diaphragm (21) between them. The short storage device (20) facilitates the formation of relatively short ion swarms.

As stated previously, mass discrimination is evident with both continuous and interrupted primary beams in a mass spectrometer. Experiments show that the effect of the mass discrimination is even more significant if a relatively short storage device is used, which is emptied without continuously being replenished. FIG. 6 illustrates an arrangement with a short storage device (20) which is separated from the rest of the storage device (22) by a diaphragm (21). The diaphragm (21) can prevent further ions being supplied by means of an ion-repelling voltage and at the same time accelerate the emptying process of the short storage device (20). The graph in FIG. 7 again shows the logarithmic intensities of the ions of different masses plotted against the delay time with which the pulser (11) is operated. Compared to the graph in FIG. 4, this graph shows that the ions with a mass of 2722 Daltons reach their maximum after only 80 microseconds but the mass discrimination is very high. With this type of arrangement and this operation mode it is not possible at all to measure a spectrum containing ions of all masses. The ions of each mass form only a physically short ion swarm which briefly passes through the pulser. With this arrangement it is not possible to establish a reasonable measuring mode; moreover the degree of ion utilization is not at all satisfactory.

Figure 7:
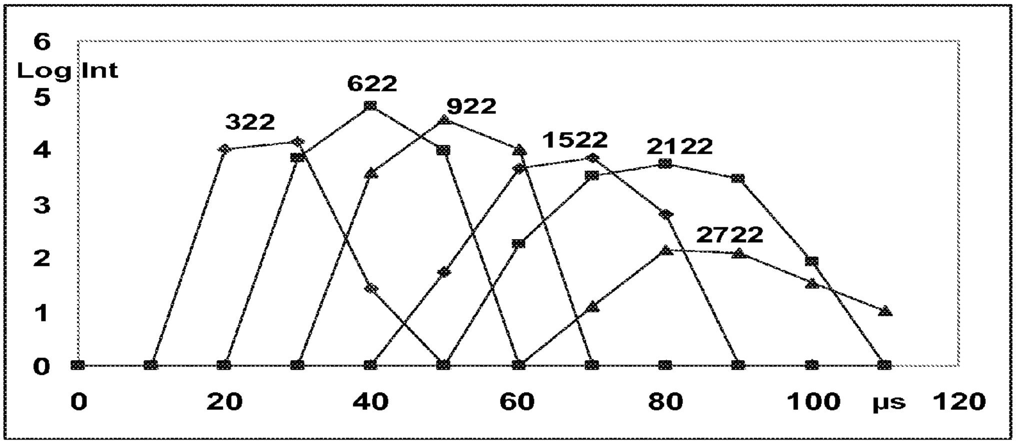
FIG. 7 presents measured ion quantity values obtained with the experimental arrangement shown in FIG. 6, for which a mode of operation was chosen in which the ions (25) do not continuously flow from storage device (22) into the storage device (20). The logarithms of the ion quantities are again plotted against the delay time of the pulsed ion ejection. It can be clearly seen that short ion swarms are formed. With this arrangement, there does not exist any delay time which produces a mass spectrum containing ions of all masses. On the other hand, it is favorable for a high acquisition rate for mass spectra, that the heavy ions with a mass of 2722 Daltons now reach their intensity maximum after a delay of only 80 microseconds.

If the lens system (9) is briefly opened or if the storage device (20) or (8) is quickly and completely emptied without the supply of ions to the storage device being continuously replenished, the ions are always extracted as a short ion cloud. The extraction of the ions is always accompanied by their acceleration, which gives the ions a predetermined kinetic energy and forms an ion beam. This ion cloud which, as a whole, forms the ion beam generally contains ions of different masses. When this ion cloud is in flight, the ions of different masses separate because they fly at different velocities so that a plurality of ion swarms are formed. In the collision-free ion beam in flight, the ion swarms thus slowly pass each other and can completely separate, as can be seen in FIG. 7. Each ion swarm has a spatial length which does not change during collision-free flight in a drift region if all the ions of the ion swarm have the same kinetic energy.

A part of invention consists in extracting the ions from the storage device in the form of short ion swarms. Another part of the invention consists of sending the ion swarms to the target volume separated in time rather than simultaneously so that all ion swarms enter the target volume at essentially the same time and with essentially the same energy. Since heavy ions with the same kinetic energy fly more slowly, their ion swarms have to be dispatched earlier or brought in front of the light ions by rearranging them during the flight.

Several embodiments of these two basic ideas of the invention, which appear to be very simple, are given here as examples. With knowledge of this invention, it will be quite possible for specialists in this field to develop further embodiments.

The first of the embodiments according to the invention presented here is one wherein the ions are extracted from the storage device mass-sequentially rather than simultaneously and hence are already sorted by this extraction, the heavy ions being extracted, accelerated and fired to the pulser earlier than the lighter ions. The mass-sequential extraction here can be realized with the aid of a DC barrier in conjunction with a harmonic oscillator in the storage device and also with a grid-shaped pseudopotential barrier at the exit of the storage device.

The DC barrier is generally generated by a lens system with rotational symmetry at the exit side of the storage device, the lowest point of the barrier being in the axis of the lens system. If the ions are to cross the DC barrier in the order of mass, they must be subjected to an energy input with mass-selective effect. This can be brought about using a resonant energy input in a potential well in which the ions can oscillate mass-specifically and which must be contained in the storage device. Such storage systems with potential wells and the options for resonant excitation of the ions have been widely described in the literature.

A particularly simple mass-selective energy input can be performed in a linear quadrupole ion trap which serves as the storage device. It concerns the axial ejection of the ions by radial resonant excitation of the mass-specific ion oscillations in the fringe field at the end of the ion trap. In this case, however, the only ions ejected are those which are in the fringe field at this time, not all the ions from the ion trap. This type of so-called "axial ion ejection" is nevertheless of interest for this invention because the ions emerge with a very low kinetic energy and, most importantly, a very narrow spread of kinetic energies. It too results in the formation of relatively short ion swarms, although not all ions are ejected from the ion trap; the swarm formation results from the exhaustion of the ions within reach in the fringe field. The ions which overcome the potential barrier in the lens system in this way emerge with very little surplus energy exactly in the middle of the lens system. They are therefore already ideally focused. As they roll down the potential barrier they all receive a similar acceleration, which can be reduced or increased as necessary by means of further potential profiles.

Figure 11:
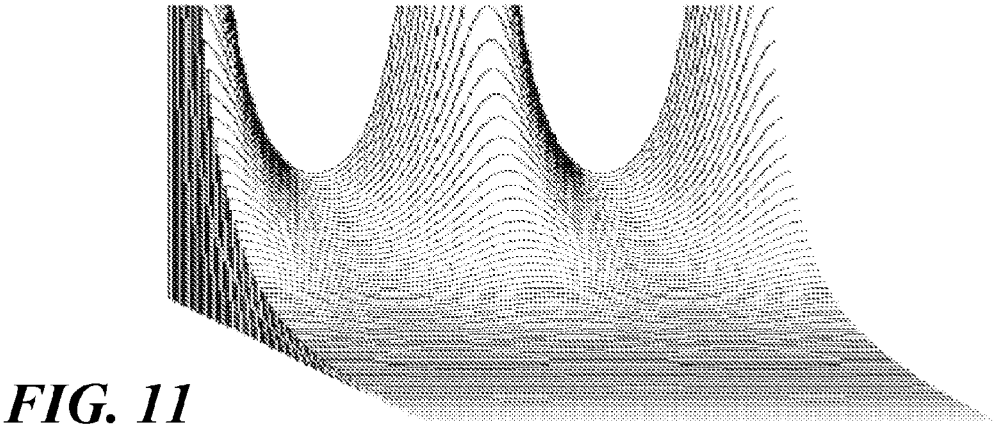
FIG. 11 shows the pseudopotentials across three grid rods of a bipolar RF grid calculated by a computer simulation program. There are saddle-shaped through-passages between each of the grid wires. Since the height of the pseudopotential is inversely proportional to the mass of an ion, light ions are kept back while heavy ions above a mass threshold which can be set by the amplitude of the RF voltage can pass through the pseudopotential saddle. The ions pass through without losses; the ions cannot be lost as a result of hitting the rods of the grid because they cannot reach them.

Another embodiment of a mass-sequential emptying of a storage device in the desired order involves an electrode structure across which RF voltages generate a barrier using pseudopotentials. FIG. 11 shows the pseudopotential of a bipolar grid with thin grid wires which repels ions of both polarities. The pseudopotential is particularly strong around the wires of the grid and has saddle-shaped passages between the grid wires. The pseudopotential at the saddle-points does not have the same value for all ions since it is inversely proportional to the mass of the ions. The pseudopotential is thus lower for ions with a high mass than for light ions. A grid (23) of this type can close off the storage device at the exit. High RF voltages can also be used to set the pseudopotentials of the potential saddles to a value which is high enough that heavy ions cannot leave the storage device either. A puller lens (9) with a DC potential which attracts the ions can be mounted behind the grid. If the RF voltage is now reduced, and the repelling and attracting DC voltages across the lenses (21) and (9) increased when necessary, then the heavy ions emerge first, as is required by the invention, followed by ions with ever-decreasing masses. These are focused in the puller lens (9), accelerated to the required energy and dispatched to the target volume. The reduction of the RF voltages is performed in a time-controlled way, so that all ion swarms arrive at the target volume at the same time. For filling the pulser of an OTOF, an energy of around 20 electron-volts is favorable. For other types of target volumes, other energies may be required. Special measures are necessary to focus the ion beam as required.

In the case of a barrier made of pseudopotentials, it is possible to generate short ion swarms using short storage devices (20) in conjunction with fast emptying. The fast emptying can be brought about by suitable electric potential gradients in the interior of the storage device (20) and by pulling voltages across the lens system (9). A short storage device should be understood here as a storage device whose length is less than roughly six times the internal diameter of the storage space. In this short type of storage device (20), an ion-repelling potential across the entrance diaphragm (21) can drive the ions in the interior towards the pseudopotential barrier of grid (23) at the exit end of the storage device so that they can leave the storage device as soon as the pseudopotential barrier across the grid (23) is sufficiently reduced. DC potential gradients within the storage device can, however, be also generated by a multitude of familiar other means, for example by using quadrupole or hexapole diaphragm stacks or by resistive coatings supplied with voltage on the pole rods of a multipole rod system.

Figure 12:
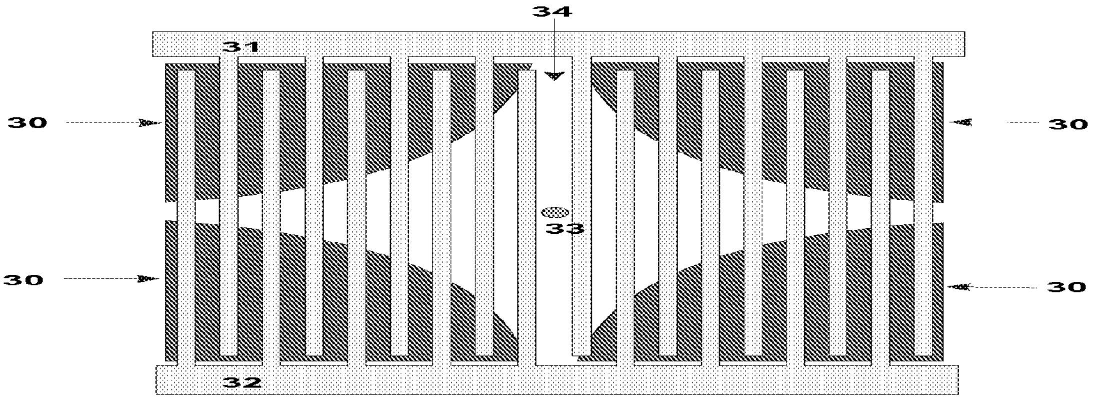
FIG. 12 shows a bipolar RF grid (31, 32) in front of the end surfaces (30) of a hyperbolic quadrupole rod system. The ion cloud in the quadrupole system which serves as the storage device has only a very small cross section (33). The middle slit (34) of the grid is somewhat wider here so the potential saddle here is at a lower pseudopotential and ions will only leave the storage device through this slit when the pseudopotential is lowered.

FIG. 12 illustrates schematically a bipolar grid in front of the end surface of a quadrupole rod system with hyperbolic pole rods which forms the storage device here. This type of grid is often termed a Bradbury-Nielsen grid, although the latter is actually operated with DC voltages and used as an ion current switch. After being damped in the collision gas, the ion cloud in the storage device takes the form of an elongated thin cylinder with very small circular cross section (33) in the axis of the storage device. The two phases of the RF voltage are across the two grid combs (31) and (32) which form the grid. The middle slit here has been made a little wider than the other slits, resulting in a lower saddle potential at this point, and the ions emerge solely through this slit, especially since a pulling voltage of the subsequent puller lens system (9) also causes a greater field penetration through this slit. The form of the saddle potential shapes the discharging ions into an ion beam which is extremely narrow transverse to the direction of the slit, and which is accelerated to a very favorably shaped primary ion beam (10) by the puller and acceleration lens system (9). For the example of a time-of-flight mass spectrometer with pulser, an elliptical cross section of the primary ion beam is favorable for a high mass resolving power. The most favorable orientation depends on the design of the pulser, since there are pulsers with grids and pulsers without grids but with slit diaphragms. The remaining teeth of the two grid combs (31) and (32) are only important when the ions flow into the storage device because they hold the ions, which initially flow in undamped and in a wild manner, in the storage device. The grid as a whole can also be put at a repelling DC potential in order to initially hold back the inflowing ions.

Figure 13:
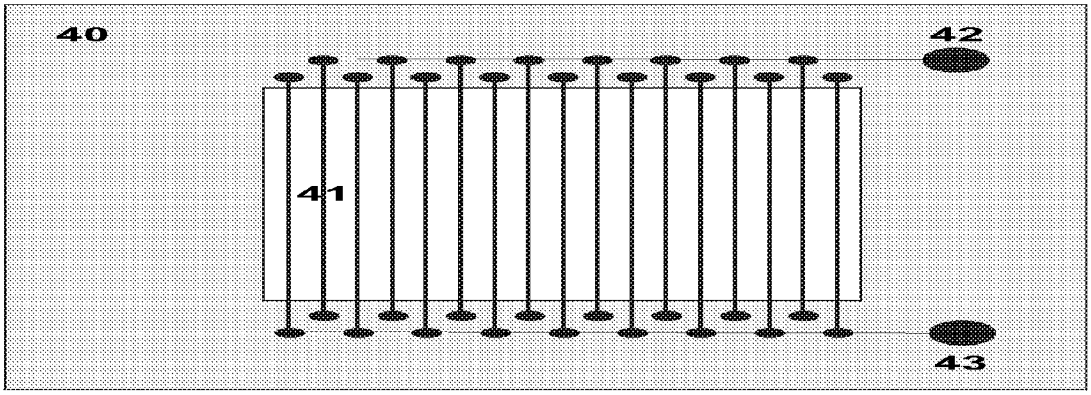
FIG. 13 shows a technical embodiment of a bipolar RF grid. The aperture in a base plate (40) made of circuit board material or ceramic is covered with thin wires (41) which have been soldered on. The wires (41) here can be soldered into fine, metallized holes. The base plate can also contain a printed circuit to supply the wires with voltages; in this diagram, simple connections for the two phases of an RF voltage have been marked. It is also possible, however, to superimpose individual DC voltages onto the wires, for example, in order to drive the ions from the outer slits to the middle slit.

A technical embodiment of such a bipolar grid is shown in FIG. 13. In this case, the aperture of a support plate (40) is covered with fine wires (41). The wires can be 0.2 millimeters thick, for example, with a separation of around 0.8 millimeters. Thin wires like this reduce the losses of ions with higher energy which could penetrate to the wires, but they require higher RF voltages in order to keep the saddle potentials at the same level as with thicker wires. The support plate (40) can be made from the same material as electronic circuit boards, for example; if very high demands are made with respect to a clean and uncontaminated vacuum, it can also be made of ceramic. The support plate can also accommodate more complicated electronic circuits than the simple feed of the two RF phases via the contacts (42) and (43) shown in the diagram. It is possible, for example, to superimpose ion-repelling DC voltages onto the RF voltages of the outer wires in order to direct the ions to the middle slit.

Figure 14:
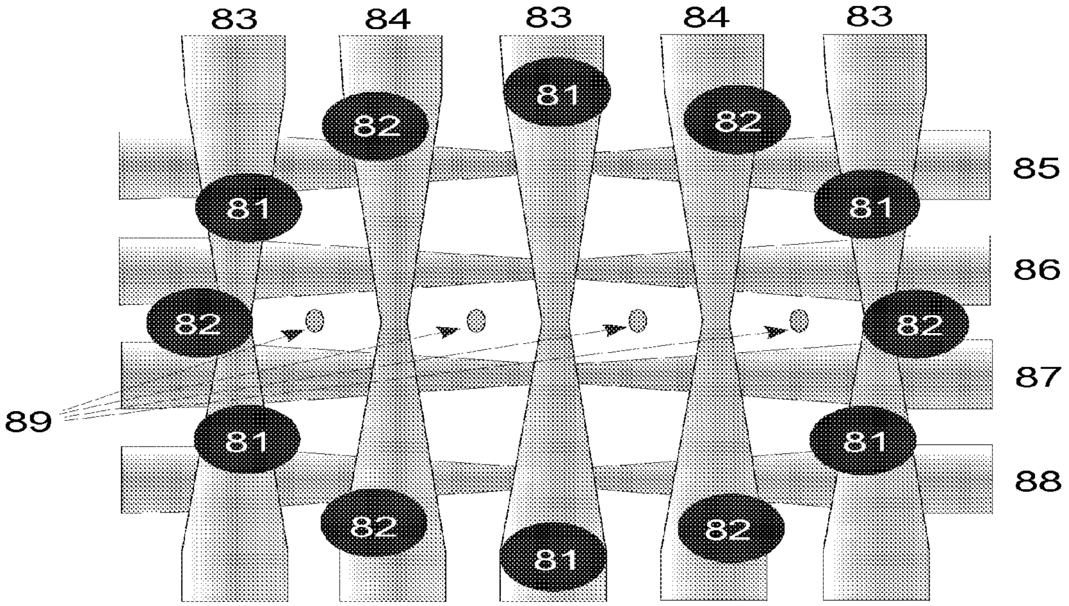
FIG. 14 illustrates a focusing double grid array at the end of a dodecapole rod system made of rod pairs (81, 82) which serves as the storage device. A dodecapole rod system by itself cannot hold the ions in the axis; the ions are widely distributed over the interior cross section. The grid array consists of a first grid with the rod pairs (83, 84), the rods in the middle all tapering into a double cone. If the two phases of an RF voltage are connected across the rod pairs, troughs of the pseudopotential between the rods are produced; the troughs allow ions pushed by the DC voltages to flow to the middle where a reduction in the RF voltage allows them to flow out through the drain holes (89) roughly in the form of spots. They then enter the potential trough between the rods (86) and (87) of the next grid where, driven by a slight DC voltage between the two crossed grids, they flow to the middle again where they can pass through the second grid in the form of spots.

With pseudopotential grids the emerging ions can also be focused towards the axis in a completely different way. This is illustrated here using the example of a dodecapole rod system which is to act as the storage device. FIG. 14 illustrates a schematic representation of the exit of the dodecapole rod system, the pole rods appearing only as black solid circles. This rod system with six pairs of pole rods does not form a particularly well-pronounced minimum of the pseudopotential close to the axis. The ions thus do not collect strictly in the axis, but distribute themselves widely over the inside surface of the cross section, repelled from each other by their charge. The heavy ions, in particular, collect outside in front of the pole rods. The advantage of such a dodecapole rod system lies in the fact that ions of a very large mass range can be collected without losses. The disadvantage lies in the fact that the heavy ions cannot simply be drawn out close to the axis because they do not collect close to the axis. A special form of focusing is thus required to focus the heavy ions to the central axis of the rod system as they emerge.

Figure 15:
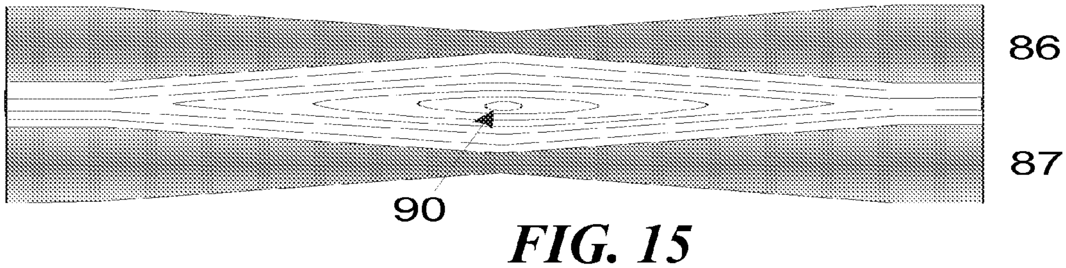
FIG. 15 illustrates a trough-shaped pseudopotential between the grid rods (86) and (87) in the form of contours with a minimum (90) which serves as the exit aperture for the heaviest ions in each case when the RF voltage is decreased.

This focusing is undertaken here with two crossed grids which both have grid rods with a special form. The grid rods all taper conically towards the middle; they thus have a double conical form. In front of the first grid there is a DC voltage drop in the storage device which pushes the ions towards the grid. Between the two grids, which are only a few millimeters apart, a small DC voltage (a few volts or even a few tenths of a volt are sufficient) push the ions towards the second grid. The double conical form of the grid rods creates an elongated potential trough between the rods each time, the minimum of the pseudopotential trough being in the middle between the tapered parts of the grid rods, as can be seen in FIG. 15. The ions, which are pushed into the pseudopotential troughs between the rods by the DC gradient, pass in the potential channels to the middle and as they do so they are sorted further so that the heaviest ions pass furthest into the central minima. If the pseudopotential is now reduced by decreasing the RF amplitude, the heaviest ions emerge out first, namely through the potential minima (89) of the first grid with the rod pairs (83, 84) into the pseudopotential trough between the grid rods (86) and (87) of the second grid. Here they are again guided to the middle of the potential trough and when the RF amplitude across this second grid is also decreased they emerge well-focused by the potential minimum (90) of FIG. 15. The minima of the pseudopotential troughs can be focused to smaller passage apertures by tapering the grid rods to smaller diameters.

Another embodiment consists in already sorting the ions in the storage device so that ions of different mass collect at different points, and allowing the ions to emerge from the storage device in such a way that the sorting is retained. The heavy ions should collect close to the exit, the light ions at a great distance so that the heavy ions emerge first. The sorting can be achieved by superimposing a pseudopotential field with opposite polarity onto a DC field. The DC field exerts a mass-independent force on the ions whereas the force of the pseudopotential field is mass-dependent. The locations where both forces are in equilibrium thus depend on the mass of the ions. After the kinetic energy of the ions has been damped by the collision gas, the ions collect at points where the relevant forces are in equilibrium; the ions are therefore sorted spatially according to their mass. Spacious pseudopotential fields can be generated by RF rod systems with tapered rods, for example. After the storage device has been opened and the RF voltage reduced, first the heavy ions and then increasingly the lighter ions emerge out of the storage device.

Figure 16:
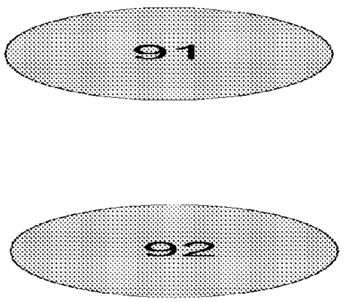
FIGS. 16 and 17 show the sorted extraction of ions in a transverse direction from a quadrupole rod system. The cloud (95) of positively charged ions stored in the quadrupole rod system with the pole rods (91-94) is unmixed if a repelling DC voltage is superimposed on the RF voltages across the two pairs of pole rods and pushes the ions out of the center. If the RF voltages are now reduced, the heavy ions escape first from the quadrupole rod system in a transverse direction followed by ions with ever-decreasing masses, as schematically shown in FIG. 17.
Figure 17:
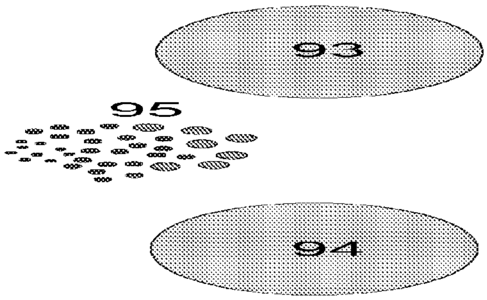

The ions do not have to be drawn out of the end surfaces of multipole rod systems, however, as in the above examples; they can also be transported out in a transverse direction through the gap between two pole rods sorted mass-sequentially from heavy to light ions. These pole rods serve as the grid which creates the pseudopotential barrier. FIGS. 16 and 17 illustrate this process for a quadrupole rod system. In a quadrupole rod system filled with collision gas, the ions arrange themselves in the axis of the rod system in such a way that the light ions are inside with the heavy ions round about them. If a repelling DC voltage is now superimposed onto the RF voltage of a rod pair, the ions are pushed out of the center so that the heavy ions are farthest away from the center. This situation is shown in FIG. 16. If the RF voltage across the pole rods is now reduced, the heavy ions leave the storage device first, as shown in FIG. 17, then increasingly the light ions as well. This creates a broad band ion beam which is particularly suitable for some purposes. If the quadrupole rod system is curved in the longitudinal direction, an ejection of the ions towards the concave side can focus the wide band again onto the centre of curvature.

As can be recognized from this quadrupole rod system, it is also possible to use the familiar RF ion traps as storage devices, either linear RF ion traps with four round or hyperbolic pole rods, or three-dimensional RF ion traps each with two end cap electrodes and a ring electrode. This would then suggest the idea of ejecting the ions using one of the well-known scanning functions used for obtaining mass spectra with these devices. The ions in these ion traps are thereby ejected through slits in the pole rods or through holes in the end cap electrodes of these ion traps. The usual ejection sequence from light to heavy ions can easily be reversed in order to fulfill the requirements for this invention. This is at least possible when ejecting the ions by resonant excitation. These embodiments do not, however, fulfill the objective of the invention because they do not eject the ions with homogeneous energies. Depending on the phase, there is a very high electric field of up to several kilovolts per millimeter across the pole rods and across the end caps. The moment they pass through the slits or holes the ions are accelerated according to the momentary phase and strength of the RF voltage; this acceleration imparts kinetic energies to the ions which range from low values up to several kiloelectron-volts. This broad energy spread of the ions means this type of ion ejection cannot be used for this invention.

There is a fundamentally different method of simultaneously filling a target volume with ions of different mass and equal energy wherein the ion swarms are extracted from the storage device simultaneously or even in the order of light to heavy ions and uniformly accelerated. The swarms of light ions fly ahead of the swarms of heavier ions either immediately or after a short flight distance, and the order of the ion swarms must be rearranged in a further flight region. The ions can be rearranged by means of either double static or dynamic bunching. One way of reversing the flight order of the ions is illustrated in the schematic in FIG. 18.

FIG. 18 uses six flight states of short ion swarms in temporal sequence in the six tracks 1-6 to illustrate how the order of flight of these short ion swarms can be reversed by so-called "bunching" whereby the kinetic energies of the heavier ions are increased in the process. A second reversed bunching then serves to return the ions to their original kinetic energy again.

Along the flight path, bunching potential gradients can be switched on and off in two sections A and C. If the ion swarms have reached section A without the potential gradient being switched on here (track 1 in FIG. 18), the heavy ions can be accelerated compared to lighter ions by switching on the bunching potential gradient (track 2) so that they (track 3) overtake the light ions at point B of the trajectory. The heavy ions now continue to fly with increased velocity but are decelerated again by a switched-on, reversed bunching energy-braking potential gradient in section C (track 4). If all ions now have the same kinetic energy because of the deceleration, the braking potential is switched off (track 5) and the ion swarms now again fly on with their original energy. The light ions catch up with the heavy ones again at point D of the trajectory (track 6). The target volume must therefore be placed at this point D in order to allow ions of all masses to enter the target volume simultaneously and with equal energy in accordance with the invention.

This case of static bunching potential gradients which, although switchable, are present in a stationary state when switched on, contrasts with dynamic bunching in which the potentials are dynamically changed in specific, spatially fixed sections of the flight path. This method is schematically represented in FIG. 19. The order of flight is thus reversed here by two path sections (43) and (48) with potentials which can be changed very quickly. The two path sections can be two metallic pieces of tube, for example, to which potentials can be applied. As they exit the first path section (43), an increasing potential (44) effects a mass-dependent acceleration of the heavier ions which causes the flight order of the ion packages to reverse in the intervening field-free flight region (45). As they fly into the second path section (48), a decreasing potential (49) ensures that all ions again adopt the same kinetic energy before the ion swarms, now in the order required by the invention, enter the target volume. By controlling the time of the potential changes in the two path sections, it is thus possible to ensure that the ion swarms all reach the target volume at the same time and with equal energy.

These two methods of rearranging the ions during the flight require a long flight region, in which the primary beam with the ion swarms runs the risk of losing its narrow cross section. This risk can be avoided by confining the whole primary ion beam in an elongated multipole field which continuously focuses the ions. There must be a good vacuum in this multipole field, however, to prevent any deceleration of the ions, as is also generally required for the target volume, for example the pulser (11) and the flight region (29) of the time-of-flight mass analyzer. The multipole field can take the form of a segmented multipole rod system, with individual segments serving as path sections for the change of the bunching potentials.

For the embodiment of the method according to the invention in mass spectrometers, it is possible to use mass spectrometers which, in some cases, have been only slightly modified compared to instruments in use today.

It is thus possible for a time-of-flight mass spectrometer for the orthogonal injection of ions extracted from a storage device, accelerated, shaped into a primary ion beam and dispatched to the pulser, to undergo a slight modification to its storage device and the time control of its ion dispatch so that it is set up for the method according to the invention. The storage device here must be set up so that it allows a mass-sequential extraction of the ions in the order from high to low masses.

Such devices can, for example, resonantly excite the mass-characteristic oscillations of the ions in an ion trap, which acts as a storage device, to eject the ions. In a linear RF ion trap, they can especially resonantly radially excite the ion oscillations of the ions in the fringe field at the end of the linear ion trap, thus bringing about an axial ejection of the ions.

Such devices can also be designed accommodating an electrode structure, particularly a bipolar RF grid (23), mounted at the exit end of a linear RF ion trap, with corresponding RF voltage generators and time-control electronics. A multipole grid connected to a multiphase RF voltage can also be used here. The RF voltages can generate a pseudopotential barrier across the grid. As described above, this can very easily be used for a mass-sequential emptying which runs from heavy to light masses. Such grids are illustrated in detail in FIGS. 12, 13, 14 and 15. The pseudopotential around the wires of a simple grid is shown in FIG. 11.

As already described above, the target volumes can belong to very different types of mass spectrometers, for example as measuring cells to ion cyclotron resonance mass spectrometers, as pulsers to time-of-flight mass spectrometers, or to mass spectrometers with electrostatic ion traps. For all these mass spectrometers, it is favorable to facilitate a rapid filling of the target volume by generating short ion swarms. This can be done using spatially and temporally short ion swarms which, in turn, are generated by a rapid emptying of the storage device for ions of one mass. Short storage devices (20) are favorable here or, alternately, potential gradients along the axis in the interior of the storage device (20) can produce a rapid emptying. This can be done by the field penetration of a potential from the diaphragm (21) mounted at the entrance end, for example. An axial potential gradient can also be generated by quadrupole or hexapole stacks of plates, as described in DE 10 2004 048 496 A (C. Stoermer et al.). Such potential gradients push the ions against the pseudopotential barrier and ensure a very fast emptying in the order of around ten microseconds per ion swarm.

Figure 1:
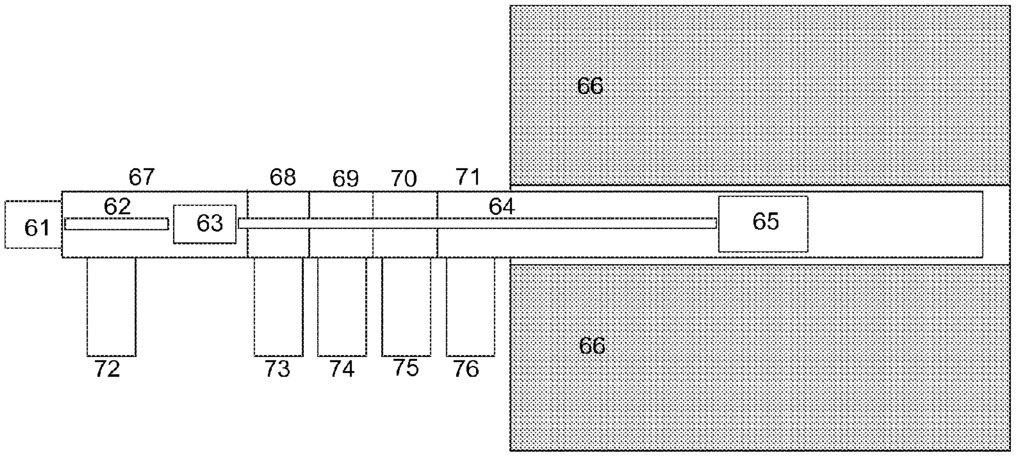
FIG. 1 shows a schematic representation of an ion cyclotron resonance mass spectrometer in which the ions, generated in an ion source (61) and introduced through an ion guide (62) into the storage device (63), are to be transferred from the storage device (63) through an ion guide (64) to the measuring cell (65). The measuring cell (65) is located in a vacuum system with differential pump stages (67-71) which protrudes into the magnetic field generator (66) and is differentially evacuated by pumps (72-76).
Figure 2:
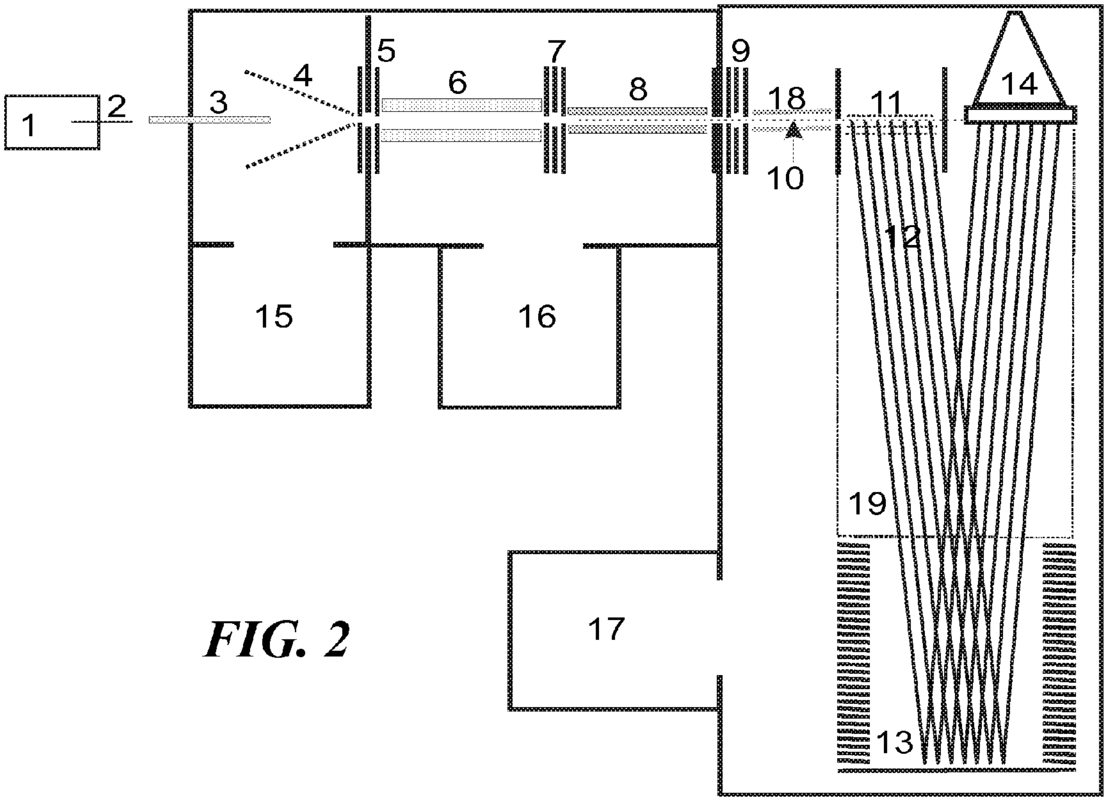
FIG. 2 shows a schematic representation of a time-of-flight mass spectrometer which corresponds to the prior art. Ions are generated at atmospheric pressure in an ion source (1) with a spray capillary (2) and introduced into the vacuum system through a capillary (3). An ion funnel (4) guides the ions through a lens system (5) into a first ion storage device (6), from which ions switched by a further lens system (7) can be transferred into a second storage device (8). The storage device (8) is loaded with collision gas in order to collisionally focus the ions. The switchable acceleration lens (9) fills the pulser (11) with ions of a primary beam (10) from the storage device (8). Between the switchable lens (9) and pulser (11), the flight region is shielded by a casing (18) to reduce the electrical influence that the switchable lens and the pulser exert on each other and particularly also to reduce all electrical and magnetic interferences affecting the primary ion beam (10). The pulser pulse-ejects a section of the primary ion beam (10) orthogonally into the drift region (19), which is at a high potential, thus generating the new ion beam (12). The ion beam (12) is reflected in the reflector (13) so as to be velocity focused and is measured in the detector (14). The mass spectrometer is evacuated by the pumps (15), (16) and (17).
Figure 3:
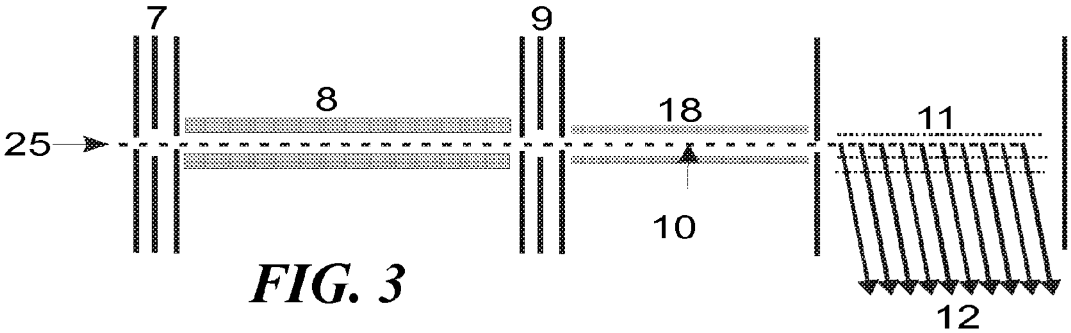
FIG. 3 illustrates an enlarged section from the time-of-flight mass spectrometer in FIG. 2, with storage device (8), switchable lens (9), primary beam (10), casing (18), pulser (11) and orthogonally accelerated ion beam (12). The storage device is continuously filled with ions of the beam (25) through the lens (7) in the mode valid for the measured values in FIG. 4.

A description of a measurement procedure according to the invention is given here for a time-of-flight mass spectrometer, the pulser being considered as the target volume. The description is based on FIG. 2, which actually shows the prior art, but with the region essential for the invention from the storage device to the pulser, being taken from FIG. 9.

Ions are generated at atmospheric pressure in an electrospray ion source (1) with a spray capillary (2), and are introduced into the vacuum system through a capillary (3). An ion funnel (4) shapes the ions into an ion current (25) which carries the ions through the lens systems (5) and (7) and the ion guide (6) into the first ion storage device (22), from which the storage device (20) can be filled by switching the potential across the diaphragm (21) and switching the two storage axis potentials. The storage device (20), at least, is filled with collision gas in order to focus the ions by collisions. The pressure of the collision gas should amount to values between 0.01 and 10 Pascal; the optimum pressure in the storage device (20) is around one Pascal in order to achieve a very fast damping of the ions with a time constant of around 10 microseconds.

The electrospray ion source (ESI) (1) is one of several options here. The sample molecules can also be ionized by matrix-assisted laser desorption (MALDI), either outside the vacuum system or inside the vacuum system, for example in front of the ion funnel (4).

The pulser (11) is now filled with ions forming a primary beam (10) taken from the storage device (20), this being done according to the invention in the form of ion swarms which are extracted out of the storage device mass-sequentially by reducing, in a time-controlled manner, the pseudopotential across the bipolar RF grid (23) in conjunction with pulling voltages across the puller and acceleration lens (9). A puller and acceleration lens is characterized by the fact that it forms a suction field for the ions in front of the lens, and that the ions are accelerated in the lens, i.e. the axis potentials in front of and behind the lens are different. An acceleration lens can focus a divergent primary ion beam to a very narrow ion beam with a small cross section and low divergence.

Figure 8:
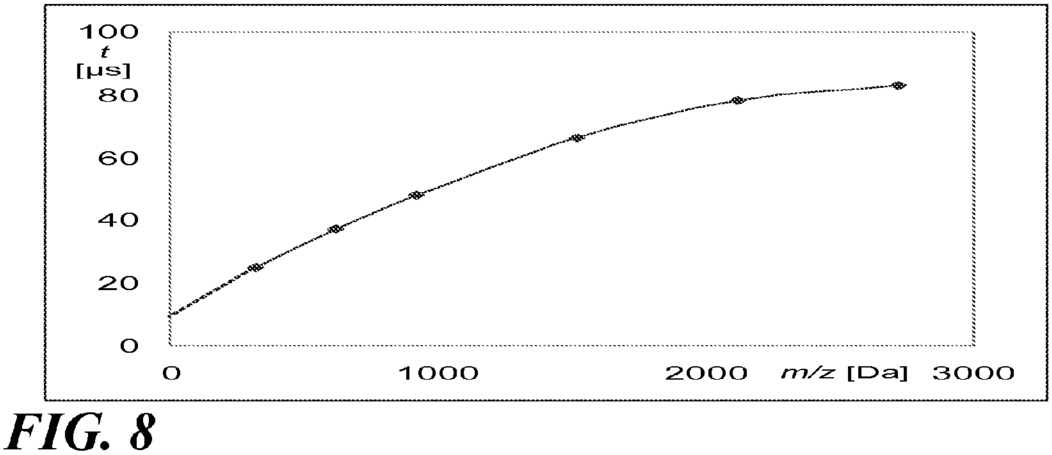
FIG. 8 shows the function of the flight times t of the ions from the storage device (20) to the pulser (11) as a function of their mass m/z, as can be obtained from FIG. 7.

Since the ions of the same mass should emerge from the storage device as quickly as possible in order to produce a short ion swarm then, firstly, the storage device (20) should be short and, secondly, an electric field should also exist in the interior of the storage device which drives the ions to the exit. In our own experiments, a quadrupole storage device only 10 millimeters in length and with an inside rod distance of six millimeters has proven to be favorable. In conjunction with the electric penetrating field of the potential across the diaphragm (21) this results in an emptying time of only around 10 microseconds, as can be estimated from the dashed extrapolation of the time-of-flight curve in FIG. 8 for the fictional mass of zero Daltons.

A potential gradient in the axis of the storage device can also be generated by other means, as is described in the patent specification U.S. Pat. No. 6,111,250 (B. A. Thomson and C. L. Jolliffe) or in U.S. Pat. No. 7,164,125 B2 (J. Franzen et al.), for example. It is also particularly favorable to use a quadrupole or hexapole diaphragm stack, as has been introduced in the above-cited patent application publication DE 10 2004 048 496.1 (C. Stoermer et al.). The storage device here can also be longer since the internal electric field causes the ions to collect in front of the exit of the storage device.

The form of the pseudopotential across bipolar RF grids, as can be seen in FIG. 11, or across similar electrode arrangements, has already been reported in detail. Since the height of such a pseudopotential is inversely proportional to the mass of the ions, a rapid, continuous, and time-controlled reduction of the RF voltage can bring about first the emergence of ions with high mass, followed by ions of ever-decreasing masses. Superimposing DC voltages onto the RF voltages across the wires makes it possible to drive the ions to the central slit, this being the only slit through which they can emerge. The central slit can also be slightly wider than the neighboring slits, as can be seen in FIG. 12; the saddle potential is then lower at this point so that the ions emerge only here. The middle slit here can also be wider open in the middle by bending the grid rods in order to allow the ions to preferably emerge in the axis of the storage device. In conjunction with a suction field of the acceleration lens (9), whose field penetration extends through the grid, it is possible to generate a primary ion beam (10) with an extraordinarily favorable shape, consisting of short ion swarms.

Between the switchable lens (9) and pulser (11), the flight region is shielded by a casing (18) in order to reduce the effect of electric and magnetic interferences on the primary ion beam (10). An ion beam with an energy of only 20 electronvolts is exceptionally susceptible to interference and can very easily be deflected. This immediately causes the mass spectra to deteriorate because their quality depends on an extraordinarily good and reproducible positioning of the primary ion beam (10) as it flies through the pulser (11).

As is the case with all conventional time-of-flight mass spectrometers with orthogonal ion injection, the pulser pulse-ejects a section of the primary ion beam (10) orthogonally into the flight path (19), which is at a high potential, thus generating the new ion beam (12). The ion beam (12) is reflected in the reflector (13) so as to be velocity focused and is measured in the detector (14). The mass spectrometer is evacuated by the pumps (15), (16) and (17).

According to the invention, ion packages which are as short as possible are extracted from the storage device (20) mass-selectively and mass-sequentially, are formed into a primary ion beam (10) and fired to the pulser (11). As the above-described experiments confirm, an arrangement similar to the one in FIG. 9 can be used to reduce a flight time for heavy ions down to only 80 microseconds despite the path between the lens (9) and the pulser (11) being around 40 millimeters. This makes it possible to achieve a very favorable rate of 10 kilohertz for acquiring the mass spectra. The pulser (11) has a usable length of around 20 millimeters.

The mass resolution of the emptying process can be very low. It is not detrimental to the invention if the ion swarms are dispatched so as to overlap. This makes it easy to fulfill the required scanning times of only some 50 to 80 microseconds for reducing the pseudopotential across the grid (23).

It is known that there are also lower mass thresholds for pseudopotential barriers, namely when the ions are so light and fast that they can penetrate through the field in only one ion-attracting half wave of the RF voltage or can penetrate as far as the grid rods. The properties of this threshold are analogous to the lower mass thresholds for quadrupole filters, RF ion guides and RF storage devices. However, to avoid any impairment, it can always be reduced to below the lower mass threshold of the storage device by selecting the frequency of the RF voltage. It is favorable in this case to select the frequency of the RF voltage across the grid so it is an integral multiple of the frequency across the storage device so that no undesired interferences occur.

Figure 9:
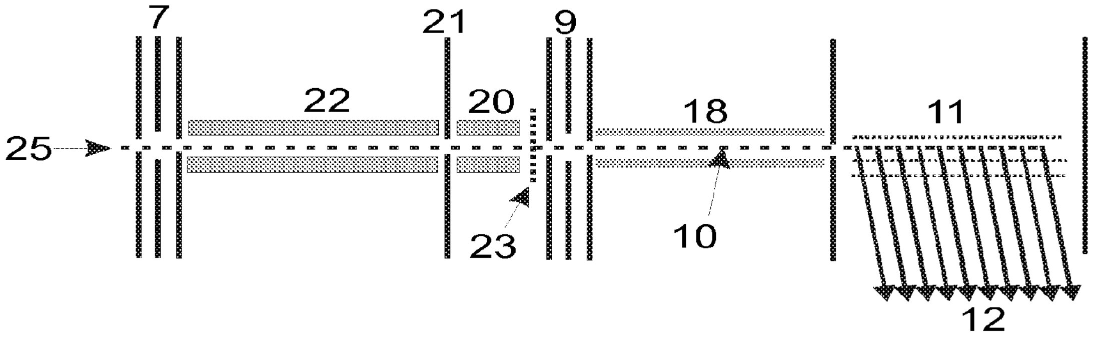
FIG. 9 shows an embodiment according to the invention with a bipolar RF grid (23) behind the short storage device (20). The two phases of an RF voltage of several megahertz are applied across the bipolar RF grid (23); the pseudopotential of the RF voltage, in conjunction with DC voltages across diaphragm (21) and the lens unit (9), forms a barrier for the emerging of ions from the storage device (20). Only ions with very high masses above a mass threshold can emerge. If the mass threshold is quickly reduced, first heavy ions and then ions with ever-decreasing masses leave the storage device (20) in rapid succession. An ion-repelling potential across the diaphragm (21) makes it possible to achieve a very fast emptying which takes only a few tens of microseconds.
Figure 10:
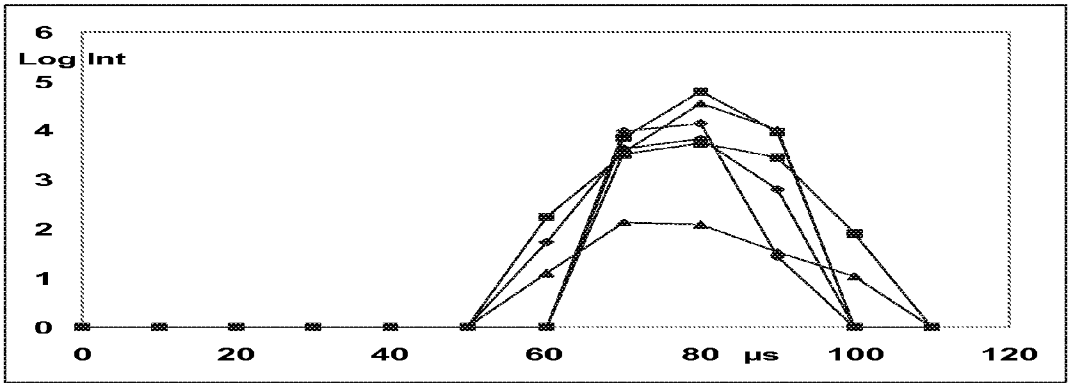
FIG. 10 presents a rough simulation of how the maxima in FIG. 7 can be compressed according to the idea of this invention by mass-sequential dispatch of the individual ion swarms to the pulser so that the ions of different masses fly through the pulser at the same time. If the delay time of the pulser is around 80 microseconds, it is then possible to measure a mass spectrum with high trueness of mixture concentrations. If all the ions are completely within the pulser at this time because they have the form of short ion swarms, then nearly 100% utilization of the ions will be achieved.

When the storage device (20) has been emptied, it can be refilled again from the preceding ion storage device (22) in FIG. 9 by switching the potential across the diaphragm (21) and the axis potentials of the two ion storage devices. It is particularly favorable if a potential gradient can likewise be switched on in the axis of this ion storage device (22), i.e. if it takes the form of a quadrupole diaphragm stack, for example, because these potential gradients then make it possible to achieve a particularly fast transfer of the ions from the ion storage device (22) to the storage device (20).

If the diameter of the ion beam which is injected into the pulser can be reduced from the now usual 0.6 millimeters to around 0.3 millimeters then, theoretically, the mass resolution of the time-of-flight mass spectrometer is improved by a factor of four because the residual errors of the spatial focusing are of quadratic nature. Modern table-top instruments with effective flight paths of around two meters have resolutions of around R=15,000, i.e. two ions with the masses 5,000 and 5,001 can be readily separated from each other. It will not, however, be possible to fully achieve the improvement by a factor of four to R=60,000 because other factors also play a part, for example detector influences. But it is to be expected that the mass accuracy, which amounts to some three millionths of the mass for modern time-of-flight mass spectrometers with the above-described design, will increase considerably. The improvements to the cross section of the primary ion beam which accompany this invention mean that mass accuracies of around one millionth of the mass being measured can be expected.

A mass spectrometer of this type will not only have a higher mass accuracy, the duty cycle for the ions will also increase because the pulser can always be precisely filled with ions and only a few ions are lost. However, the relatively dense filling of the pulser with ions which is possible with the system in FIG. 9 can only be readily used in mass spectrometers with analog-to-digital converters (ADC).

With modern ion sources and systems for introducing the ions into the vacuum system, the ion current in the vacuum system in the maxima of the substance feed to the ion source can quite easily reach around one picoamp. This corresponds to around a thousand ions in the pulser (11) at a pulse frequency of ten kilohertz. If the pulser is filled with around a thousand ions, then the number of ions which can be collected in one period of the ADC can quite easily be around 200 ions because a mass peak from modern transient recorders with two gigahertz acquisition rate extends over five to ten measuring periods. Modern transient recorders incorporate analog-to-digital converters with sufficient velocity and sufficient measuring width to fulfill this task. With an eight bit digitizing width they can measure at a rate of two gigahertz. In the future it is expected that there will be transient recorders with a measuring rate of 8 gigahertz for a ten to twelve bit measuring width.

The greatest advantage of the measuring method according to the invention, however, lies in the fact that the operator no longer has to set the delay time to select the most favorable sensitivity within the operating mass range. In general, it is possible to set several operating mass ranges in time-of-flight mass spectrometers with orthogonal ion injection, for example 50 to 1,000 daltons, 200 to 3,000 daltons or 500 to 10,000 daltons, as has already been explained above. With this invention it is possible to automatically set the correct time function for the emptying of the storage device for each of these operating mass ranges. A mass spectrum with high trueness of mixture concentrations is obtained every time, and the high degree of ion utilization of this mass spectrum means that it also exhibits the highest possible sensitivity for all ions of the operating mass range.

Similar advantages are also obtained for the other types of mass spectrometer for which the filling methods according to the invention can be used.

What is claimed is:

1. A method for filling a target volume from a distant storage device with ions having different masses, but substantially equal energies, comprising:

extracting ions from the storage device in a plurality of ion swarms, wherein each ion swarm is a spatially limited group of ions all having the same mass and the ion swarms have a initial order with swarms of lower mass ions followed by swarms of higher mass ions; and reversing the initial ion swarm order by applying a bunching potential to the plurality of ion swarms to retard the motion of ion swarms composed of higher mass ions and subsequently restoring initial kinetic energies of ions in the plurality of ion swarms by applying a reverse bunching potential to the ion swarms.

2. The method of claim 1, wherein the bunching potential comprises one of a static potential ramp that is applied and removed and a dynamic potential changing steadily over time.

3. A method for filling a target volume from a distant storage device with ions having different masses, but substantially equal energies, comprising:

storing ions in the storage device by generating a pseudopotential barrier at an exit of the storage device via a grid that has grid rods connected spatially alternately to different phases of an RF voltage and arranged to form a plurality of slit apertures;

extracting ion swarms mass sequentially from the storage device through a central slit aperture that is located at the center of the grid and is wider than neighboring slits in order to reduce a height of the pseudopotential barrier at the central slit aperture; and manipulating a flight order of the extracted ion swarms from the storage device to the target volume.

4. The method of claim 3, further comprising generating potential gradients in an interior of the storage device and across the exit of the storage device.

5. A method for filling a target volume from a distant storage device with ions having different masses, but substantially equal energies, comprising:

storing ions in the storage device by generating a pseudopotential barrier at an exit of the storage device via a grid that has grid rods connected spatially alternately to different phases of an RF voltage, each grid rod having a double conical longitudinal profile;

extracting ion swarms mass sequentially from the storage device by reducing a height of the pseudopotential barrier; and manipulating a flight order of the extracted ion swarms from the storage device to the target volume.

6. The method of claim 5 wherein the step of generating a pseudopotential barrier comprises generating a pseudopotential barrier via two crossed grids, each of which has grid rods connected spatially alternately to different phases of an RF voltage and wherein each grid rod has a double conical longitudinal profile.

7. A method for filling a target volume from a distant storage device with ions having different masses, but substantially equal energies, comprising:

storing ions in the storage device by generating a pseudopotential barrier at an exit of the storage device via a bipolar grid that has grid combs connected to different phases of an RF voltage;

extracting ion swarms mass sequentially from the storage device by forcing the ions towards an axis of the storage device by one of a quadrupole rod system and a quadrupole stack to enable the extraction of the ions through a middle slit of the bipolar grid; and manipulating the flight order of the extracted ion swarms from the storage device to the target volume.

* * * * *